United States Patent [19]
White et al.

[11] Patent Number: 5,838,216
[45] Date of Patent: Nov. 17, 1998

[54] COMMON-MODE EMI FILTER

[75] Inventors: Curtis B. White; W. Kyle Anderson; Frank W. Allen, III, all of Rockford, Ill.

[73] Assignee: Sunstrand Corporation, Rockford, Ill.

[21] Appl. No.: 711,432

[22] Filed: Sep. 6, 1996

[51] Int. Cl.$^6$ ....................................................... H03H 7/02

[52] U.S. Cl. .......................... 333/182; 333/185; 439/620

[58] Field of Search .................................. 333/181–185; 439/620

[56] References Cited

U.S. PATENT DOCUMENTS

| | | | |
|---|---|---|---|
| 3,435,387 | 3/1969 | Reinke et al. | 333/183 |
| 3,538,464 | 11/1970 | Walsh | 333/182 |
| 3,961,294 | 6/1976 | Hollyday | 439/620 X |
| 4,781,624 | 11/1988 | Shepherd | 439/620 X |
| 5,153,540 | 10/1992 | Gliha, Jr. | 333/182 |
| 5,243,308 | 9/1993 | Shusterman et al. | 333/181 |
| 5,337,028 | 8/1994 | White | 333/181 |

*Primary Examiner*—Robert J. Pascal
*Assistant Examiner*—Justin P. Bettendorf
*Attorney, Agent, or Firm*—Antonelli, Terry, Stout & Kraus, LLP

[57] ABSTRACT

The present invention is an improved filter assembly for providing at least common-mode filtering. A filter assembly in accordance with the present invention includes a plurality of spaced apart electrical conductors (102) for carrying at least common-mode electrical current; a housing (104) electrically isolated from the plurality of electrical conductors and containing a portion of a length of the plurality of electrical conductors, the housing having an interior cavity (104) defined by a wall (112) having at least a partially electrically conductive section (114), the wall extending outward from two longitudinally spaced apart locations on the plurality of electrical conductors and between the plurality of electrical conductors at a position spaced from the plurality of electrical conductors to form the cavity; at least one inductive element (108) in a closed lower reluctance loop extending around the plurality of electrical conductors and electrically isolated therefrom and the electrically conductive portion of the wall to provide an inductance common to the plurality of electrical conductors; and at least one capacitive element (110), each capacitive element having an electrical contact with the electrically conductive portion of the wall and the plurality of electrical conductors to provide capacitance between the plurality of electrical conductors and the electrically conductive portion of the wall.

26 Claims, 8 Drawing Sheets

COMMON-MODE EMI FILTER

This invention was made with Government support under prime contract F33657-91-C-0006 awarded by the Department of Defense. The Government has certain rights in this invention.

TECHNICAL FIELD

The present invention relates to electrical filters for removing common or differential-mode current flowing in a plurality of electrical conductors and more particularly, to filters of the foregoing type which are sealed and fixed in a chamber to provide protection from the outside environment and/or damage from vibration and acceleration.

BACKGROUND ART

State of the art electronic circuits are highly susceptible to performance degradation or malfunctions induced by common-mode electrical noise flowing in conductors therein. Common-mode electrical noise flows in two or more electrical conductors relative to a reference such as ground or neutral. In many applications today, there are specifications which define the amount of permissible noise currents which may be present in electrical circuits. For example, military specifications place limits on noise current down to 14 kHz. and commercial aircraft specifications place limits on common-mode current down to approximately 120 kHz.

Presently, filters for aerospace applications rely primarily on differential-mode filters which are inserted in series with each single electrical conductor in a conductive circuit relative to a reference such as ground. This approach is used in present EMC filters for military and commercial applications which are required to meet FCC, CISPR, VDE and other applications.

Because of the stringent requirements which are required for both commercial and military aerospace applications, there is a need for a sealed common-mode filter which withstands extreme physical stress due to vibration, acceleration, thermal cycling and other deleterious conditions present in aerospace applications. Such desirable applications include common-mode filters mounted on electrical power generators for removing undesirable common-mode noise components down to the aforementioned frequency limits produced by the electrical power generating process which are sealed from the environment, small in size, light in weight and low in cost.

The prevalent practice today is for differential-mode filtering to be inserted in each of a plurality of lines in a balanced conductive system referenced ground or a three phase power system referenced to neutral. As a result of the requirement to insert a single differential-mode filter assembly in each of the lines, additional filter assemblies are required which require more space, cost more to fabricate and weigh more than what would be required if a common-mode filter design contained in a sealed housing connected to all of the electrical conductors in which common-mode current is flowing was available for filtering out undesired common-mode noise components. Further, these differential-mode filters have poor performance in reducing common-mode noise.

EMI filters have diverse designs in which combinations of inductive and capacitive elements are fabricated into differential-mode or common-mode filters. The frequency of the noise components to be filtered dictates the size of the electrical components which are used and further the filter topology. Diverse types of common-mode and differential-mode filters are known to filter EMI. The components of EMI which are removed include undesired harmonics, transients and undesired signals in electrical transmission paths of electronic systems.

EMI filters include differential-mode filters for filtering out undesired signals which are conducted on one transmission path relative to another path, common-mode filters for filtering out undesired signals conducted on two or more transmission paths where such signals conduct simultaneously and by an identical amount relative to a common reference, such as ground, and mixed mode filters for filtering out both undesired and differential-mode and undesired common-mode signals. Such filters are typically constructed by winding wire on a ferromagnetic core to form inductors and connecting the inductors in series with capacitors. As a result of using discrete elements, these filters are undesirably large and heavy which contributes adversely to the operational efficiency in aerospace applications.

Figure 1:
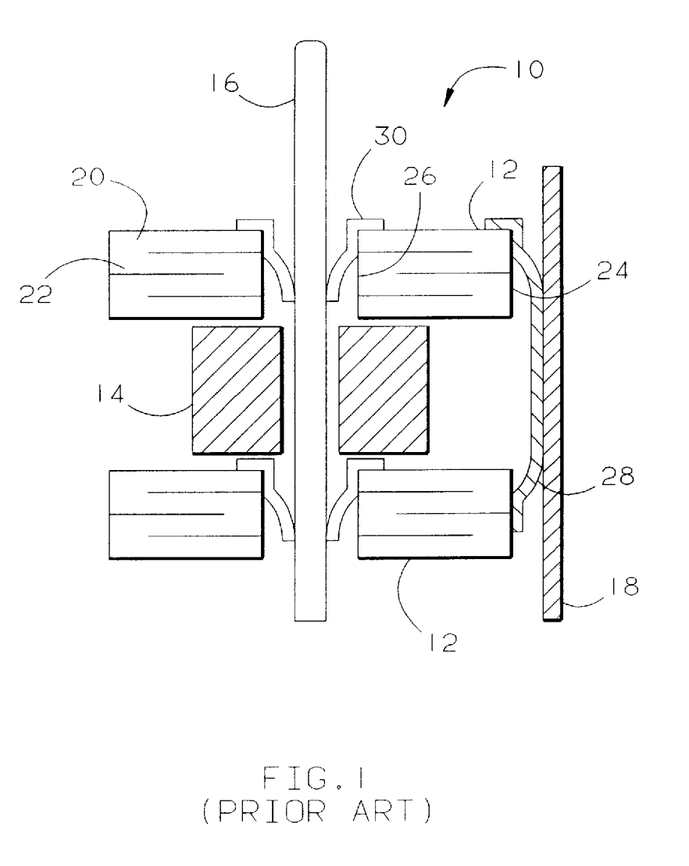
FIG. 1 is a diagram of a prior art differential-mode EMI filter.

FIG. 1 illustrates a prior art differential-mode EMI filter 10. The EMI filter 10 is comprised of a pair of planar ceramic capacitor arrays 12 and a discrete ferrite inductor 14 assembled concentrically around a single electrical conductor 16. Connector conductive back shell 18, which is only partially illustrated, forms a sealed chamber and is typically referenced to ground by the making of an electrical connection between the conductive connector back shell 18 and ground (not illustrated). The ceramic capacitor arrays 12 have a series of conductive plates 20 which are spaced apart and insulated from each other by ceramic material 22. An electrically conductive outer contact surface 24 is in electrical contact with plates 20 extending radially inward toward electrical conductor 16 and an inner electrically conductive contact surface 26 is in electrical contact with plates 20 extending radially outward. The plates 20 which extend radially inward are not electrically connected to the inner contact surface 26 and the plates 20 which extend radially outward are not electrically connected to the outer contact surface 24. An outer contact spring 28 contacts the outer contact surface 24 and an inner contact spring 30 contacts the inner contact surface 26. As a result, capacitance is established for primarily differential-mode and to a lesser extent common-mode filtering between the electrical conductor 16 and the electrically conductive connector back shell 18 by the spaced apart plates 20 which are separated by the ceramic dielectric 22. It should be understood that the connector shell extends around the entire filter assembly 10 to provide an EMI-tight filter assembly. The ferrite inductor 14 is in a loop around the electrical conductor 16 and is electrically isolated from both the electrical conductor 16 and the capacitors 12 and the electrically conducting connector shell 18. Also, multiturn inductors may be used.

The integration of filter elements into the assembly 10 of FIG. 1 provides a reduction in space and weight, cost savings from fewer components and reduction in assembly and inspection labor, and provides improved system EMI performance by elimination of parasitic effects associated with board level filters that can reduce higher frequency EMI suppression. Different combinations of capacitor and ferrite elements may be utilized to provide different types of differential-mode filtering.

However, the filter assembly 10 of FIG. 1 is not an effective common-mode filter. As a result, for filtering applications requiring common-mode filtering, multiple filter assemblies 10 must be utilized in series with each electrical conductor to achieve the desired filtering which additional multiple filter assemblies contributes to additional cost, increases size and weight of the total filter assembly is having the additional multiple differential filter assemblies which is especially disadvantageous for aerospace applications and other environments in which specifications require substantial attenuation of common-mode noise in multiple conductors referenced to either ground or a neutral. Further, as stated, the common-mode performance of the differential-mode filters is not as good.

DISCLOSURE OF INVENTION

The present invention is an improved filter assembly for providing improved filtering which, in a preferred embodiment, is at least common-mode filtering, but further may be differential-mode filtering or a combination of common and differential-mode filtering of electrical noise in which multiple spaced apart electrical conductors for carrying at least common-mode electrical noise current are contained within a housing which is electrically isolated from the spaced apart electrical conductors and contains a portion of a length of the two electrical conductors. The housing has an interior cavity which is sealed from the outside environment to provide protection from the environment such as encountered in aerospace applications and is defined by a wall having at least a partially electrically conductive section to establish connection to ground or electrical neutral. The wall extends outward from two longitudinally spaced apart locations on the plurality of conductors. It should be understood that the plurality of conductors may be two conductors which are in a balanced configuration referenced to ground or to another potential or three or more conductors such as those carrying multiple phase current referenced to a neutral or other reference. The wall extends outward from the longitudinally spaced apart locations of the plurality of electrical conductors and between the plurality of electrical conductors at a position spaced from the plurality of electrical conductors to form the cavity. At least one inductive element in a closed loop, which is ferromagnetic and preferably may be a ferrite, extends completely around the plurality of electrical conductors and is electrically isolated from the electrical conductors and the conductive portion of the wall to provide an inductance common to the plurality of electrical conductors. At least one capacitive element is provided having electrical contact with the electrically conductive portion of the wall and at least one of the plurality of electrical conductors to provide capacitance between the plurality of electrical conductors and the electrically conductive portion of the wall for providing common-mode filtering. In accordance with the invention, the filter assembly may contain only one reactive element for each electrical conductor. Each reactive element is electrically or magnetically coupled to at least one of the plurality of electrical conductors and may be coupled to a plurality of electrical conductors.

Each capacitive element preferably comprises a stack of spaced apart conductive layers having a number of apertures at a minimum equal to a number of the plurality of electrical conductors which extend through the layers. The apertures respectively each receive a different one of the plurality of electrical conductors. Each aperture forms an electrical contact with one of a different one of the plurality of electrical conductors.

The plurality of conductive layers may comprise a plurality of first conductive layers which are spaced apart and electrically insulated from each other and are in electrical contact with only one of the plurality of electrical conductors, a plurality of second conductive layers which are spaced apart and electrically insulated from each other and electrically insulated from the first conductive layers and are in electrical contact with only another one of the plurality of electrical conductors and a plurality of third conductive layers which are spaced apart and electrically insulated from each other and electrically insulated from the first and second conductive layers and in electrical contact with the electrically conductive portion of the wall.

Different configurations of the first and second conductive layers may be utilized. In a first embodiment of the conductive layers of the invention, pairs of the first and second conductive layers are disposed in a common plane on a dielectric substrate. First and second electrical conductors are connected respectively to the first and second conductive layers through electrical connection with apertures therein. In a second embodiment of the conductive layers of the invention, the first and second conductive layers are on different dielectric substrates which are coated respectively with the first and second electrical conductive layers and each have a plurality of apertures for receiving the plurality of electrical conductors. Each of the apertures of the first or second plurality of conductive layers of the second embodiment are in electrical contact with a different one of the plurality of electrical conductors and each of the first and second conductive layers are in a different plane in the stack.

In each of the first and second embodiments, a third electrically conductive layer coated on a dielectric substrate is alternated between the first and second electrically conductive layers in a stack. In the first embodiment, the third electrically conductive layer on the substrate alternates between the first and second electrically conductive layers which are coated on the common substrate. In the second embodiment, the third electrically conductive layer on the substrate alternates between the spaced apart first and second electrically conductive layers which are on different substrates. In each of the first and second embodiments the plurality of electrically conductive layers on a substrate are formed into a stack and receive the plurality of conductors through apertures therein.

Electrically conductive sleeves or melted metal connections, such as solder, may be used to promote electrical connections between the electrically conductive portion of the wall and the capacitive elements and the capacitive elements and the electrical conductors. At least one outer electrically conductive sleeve may be positioned in electrical contact with an inner surface of the conductive portion of the wall and an outer periphery of at least one capacitive element and at least one inner electrically conductive sleeve may be in electrical contact with one of the apertures and one of the plurality of electrical conductors.

Different types of inductive and capacitive elements may be utilized. For example, inductive elements may be a ferromagnetic material and more particularly may be shaped in the form of a toroid to provide a low reluctance magnetic path which surrounds the plurality of conductors to provide inductance. The capacitive elements may be ceramic capacitors.

While a preferred embodiment of the present invention is a filter assembly which filters common-mode electrical noise from electrical current flowing in a plurality of conductors, the present invention may be extended to add differential-mode filtration to individual electrical conductors to provide particular desired filter configurations having one or more capacitive or inductive filter elements for producing common and differential-mode filtering with the invention. Each differential-mode inductive element is in a closed loop extending completely around less than all of the plurality of electrical conductors to provide a low reluctance magnetic path and is electrically isolated therefrom and the electrically conductive portion of the wall to provide inductive differential-mode filtering of electrical current flowing in less than all of the plurality of electrical conductors contained in the closed loop. Each additional capacitive element is electrically isolated from the electrically conductive portion of the wall and electrically connected to less than the plurality of electrical conductors to provide capacitive differential-mode filtering of electrical current flowing in the less than the plurality of electrical conductors.

Each additional capacitive element comprises an additional stack of spaced apart conductive layers coated on a dielectric substrate having at least one aperture which extends through the additional stack and which receives less than the plurality of electrical conductors and forms an electrical contact with at least one of the plurality of electrical conductors with a different aperture contacting a different one of the at least one electrical conductor and being electrically isolated from the conductive portion of the housing. At least one first electrically conductive layer and at least one second electrically conductive layer are provided with each of the first and second electrically conductive layers being spaced apart and electrically insulated from each other. The at least one first electrically conductive layer is in electrical contact with at least one of the plurality of electrical conductors through electrical contact with one aperture and not in electrical contact with the conductive portion of the wall and the at least one second electrically conductive layer is electrically insulated from the at least one electrical conductor and the conductive portion of the wall.

The filter assembly is fabricated to withstand substantial vibration and acceleration which characterize aerospace environments. At least one insulating adhesive layer connects a face of one of the at least one inductive element to a face of one of the at least one capacitive element and at least one force applying element applies a force axially to the at least one inductive and/or the at least one capacitive element connected with the insulating adhesive layer. Each force applying element may be a compressed O-ring and further provides compensation for variation in a dimension of the at least one inductive and capacitive element parallel to the plurality of conductors. Each O-ring contacts a face of one of the at least one inductive element or a face one of the at least one capacitive element extending from the plurality of electrical conductors.

The wall of the housing comprises two conductive parts which are connected together by an insulative adhesive which is preferably thermally activated and a conductive element is disposed inside of the housing which electrically connects the two conductive parts to provide an electrical current flow path around the insulative adhesive.

While a preferred embodiment of the present invention is a filter assembly providing common-mode filtering utilizing both at least one inductive element and at least one capacitive element, it should be understood that the present invention may be practiced in configurations of filter assemblies providing common-mode filtering which contain only inductive or capacitive elements.

The filter assembly has several distinct advantages over the prior art. The filter assembly is easily manufactured to provide common-mode filtration and is contained preferably in a single hermetically sealed housing and withstands vibration and acceleration prevalent in aerospace environments which is important for protecting ceramic-type capacitors and ferromagnetic inductive materials against forces which could cause their fracture. The filter assembly provides thermal protection and sealing from the environment and further unitizes the inductive and capacitive elements into a single assembly to provide structural protection against potentially damaging environmental conditions and saves space and reduces cost. Additionally, a plurality of electrical conductors, which extend from ends of the filter assembly make connection to structures, such as electrical power generators and power buses which are prevalent in aerospace electrical power generators, simple and low cost while providing high structural integrity.

The filter assembly of the present invention by incorporating common-mode filtering capability within a single sealed assembly and permitting the addition of differential-mode filtering, meets virtually all current and foreseen aerospace EMC/EME needs. The invention improves the current state of the art by permitting common-mode as well as differential-mode filtering in a sealed design suitable for the aforementioned applications.

BEST MODE FOR CARRYING OUT THE INVENTION

Figure 2:
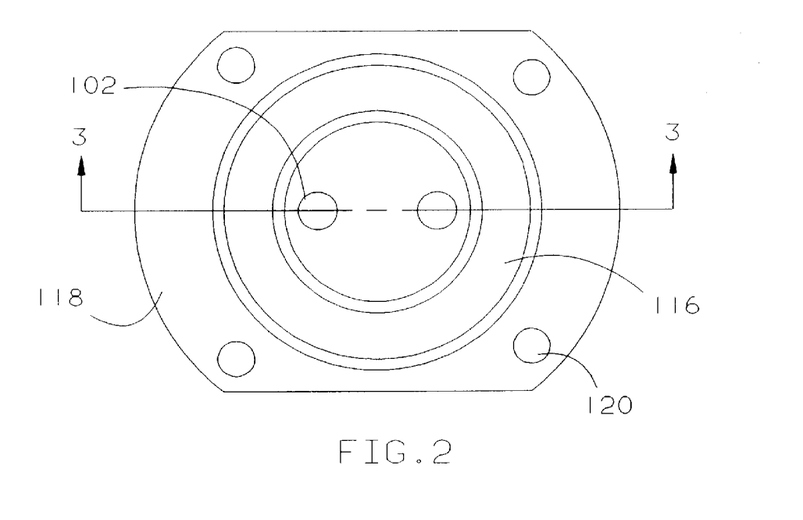
FIG. 2 is a top view of a first embodiment of the present invention.
Figure 3:
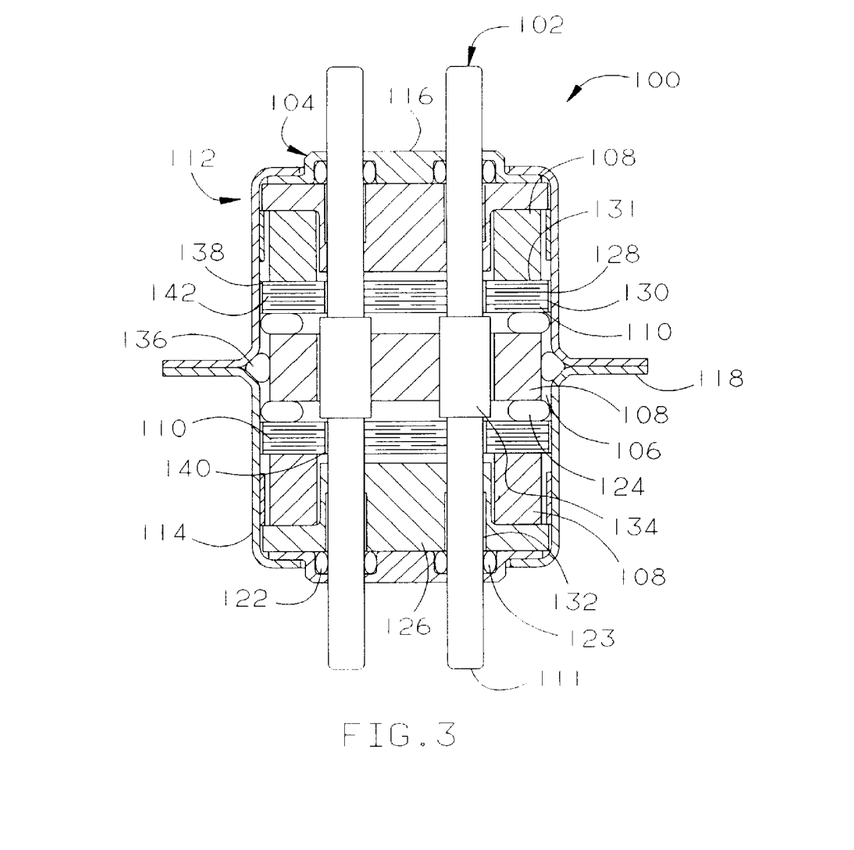
FIG. 3 is a section view of the first embodiment taken along section plane 3—3 of FIG. 2.

FIGS. 2 and 3 respectively illustrate a top and sectional view taken along section line 3—3 of FIG. 2 of a first embodiment 100 of a filter assembly in accordance with the present invention for providing at least common-mode filtering of electrical current flowing in a plurality of conductors 102 to remove undesirable current components (noise). The filter assembly 100 has a plurality of spaced apart electrical conductors 102 which extend through a housing 104. The housing 104 is electrically isolated from the plurality of spaced apart conductors 102. It should be understood that additional conductors may be utilized in addition to the two conductors 102 as illustrated for other applications in which common-mode filtering is desired such as for filtering three phase electrical current in combination with a neutral. The housing 104 contains a length of the plurality of electrical conductors 102 in a cavity 106 therein. The interior cavity 106 is preferably hermetically sealed from the outside environment by suitable gaskets and assembly techniques to provide tightly fitting surfaces to protect the at least one inductive element 108 and the at least one capacitive element 110 from the outside environment which is typified by the adverse conditions of aerospace applications involving substantial temperature fluctuations, moisture, vibration and acceleration. Ends 111 of the electrical conductors 102 are designed to fit into registration with electrical apparatus such as a power generator or circuits such as power busses in which common-mode filtering of electrical noise current flowing therein is desired to be accomplished with the filter assembly 100 of the present invention. The housing 104 has a wall 112 which is comprised of a conductive section 114 and an insulative section 116. The electrically conductive section 114 is metallic and may be formed by suitable metal working techniques and may span the longitudinal dimension of the cavity 106. A central flange 118 permits electrical connections to be made to the conductive portion 114 from reference potentials such as ground or a neutral and further, the mounting of the filter assembly 100 by suitable connectors through bolt holes 120 attached to a support surface (not illustrated). The conductive portion 114 is bent into contact with insulative endcaps 116 to enclose the cavity 106.

A plurality of O-rings 122 are provided around each of the plurality of electrical conductors 102 to seal the cavity 106 from ingress of contaminants from the outside environment along the surfaces of the electrical conductors 102. The O-rings 122 are seated in a recess 123 within the insulative endcaps 116 to form a seal preventing the ingress of moisture and other contaminants into the cavity 106.

Compressed O-rings 124 which are made of a suitable elastomeric material, apply an axial force to the plurality of inductive and capacitive elements 108 and 110 contained within the housing 104 to stabilize the overall assembly. The O-rings 124 compensate for dimensional tolerances between the inductive and capacitive elements 108 and 110 parallel to the plurality of conductors which may vary substantially and further compensate for thermal growth. A shoulder 126, which is an insulative material, fits within the cavity and provides radial support for the conductors 102 and further acts as an axial stop against the force produced by the O-rings 124 which push an assemblies of the inductor 108 and capacitor 110 as described below upward and downward respectively. A conductive inner sleeve 128 of aluminum or other metal and a conductive outer sleeve 130 of aluminum or another metal is provided to promote a good electrical contact respectively between the electrically conductive section 114 of wall 112 and the plurality of electrical conductors 102 as described below. The shoulders 126 have a plurality of apertures 132 for receiving the plurality of electrical conductors 102. Sleeves 134 are positioned around each of the conductors 102 within an annulus of the centrally located inductive element 108 adjacent the central flange 118 to provide interior support against lateral movement. Metallic spring 136 applies radially inward pressure against the central inductive element 108 to bias it in position to secure against vibration, acceleration and other environmental effects and further provides an electrical connection between the upper and lower conductive halves 139 of the housing 104. A thermally activated adhesive layer 141' bands the conductive halves 139 together. The adhesive layer 141' is insulative and the conductive spring completes the necessary electrical connection between the halves 139. A sleeve 143 fits around the outer periphery of the upper and lower inductive elements 108 to provide electrical insulation and protection against contact.

Preferably, the individual outboard inductive elements 108 closest to the endcaps 116 are formed into an integral structure with the adjacent capacitive elements 110. Preferably, ferrites may be used to form the inductive elements 108 but multiple turn wire wound inductors may also be used and the ceramics used to preferably form the capacitive elements 110 can be brittle and subject to breakage caused by shock, vibration or high G forces which typify an aerospace environment. An insulative layer 131, such as a fiberglass reinforced plastic coated on both sides with adhesive, is placed between the adjacent pairs of inductive elements 108 and capacitive elements 110 to provide a unitized structure which, because of the axial force generated by compressed O-rings 124, is held firmly in place against shoulder 126.

Each of the one or more inductive elements 108 which are used with the invention is formed in a closed loop which completely surrounds each of the electrical conductors or multiple turns of wire to provide a low reluctance magnetic circuit to enhance the inductance and is manufactured from a ferromagnetic material which preferably may be a ferrite. The loops are electrically isolated from the plurality of electrical conductors 102 and the electrically conductive section 114 of the wall 112 so as to avoid short circuiting. As will be described in more detail below, additional inductive and capacitive elements may be added which add differential-mode filtering as described in association with subsequent embodiments.

The individual capacitive elements 110, which are described in more detail below, are comprised of a plurality of conductive layers 138 each disposed on a dielectric substrate which, preferably, is a ceramic such as utilized in the prior art of FIG. 1. As will be described in more detail below, the conductive layers 138 make electrical contact with the electrically conductive section 114 and the plurality of electrical connectors 102 to produce at least capacitance between the plurality of electrical conductors and the electrically conductive section 114 of the wall 112 which is typically referenced to ground or neutral to provide capacitance for common-mode and further other types of filtering.

Each capacitive element 110 is in the form of a stack of spaced apart conductive layers which may be configured in different configurations such as, but not limited to, those illustrated in FIGS. 4A and 4B and 5A and 5B, respectively. Each of the stack of spaced apart conductive layers 138 is positioned on a dielectric substrate 142 by any well-known process and has a number of apertures 140 which are at least equal in number to the number of the plurality of electrical conductors 102 which extend through the conductive layers 138 and underlying substrate 142, receive a different one of the plurality of electrical conductors 102 and respectively form an electrical contact with only one of the plurality of electrical conductors with each electrical conductor contacting a different aperture.

Figure 4A:
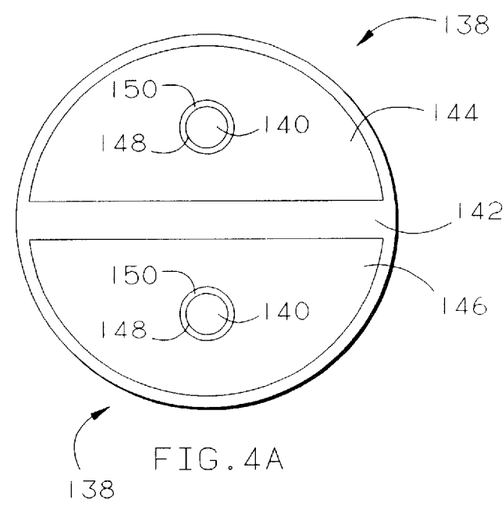
FIGS. 4A and 4B illustrate a top and side view respectively of a first embodiment of layers utilized to fabricate capacitive elements in accordance with the present invention.
Figure 4B:
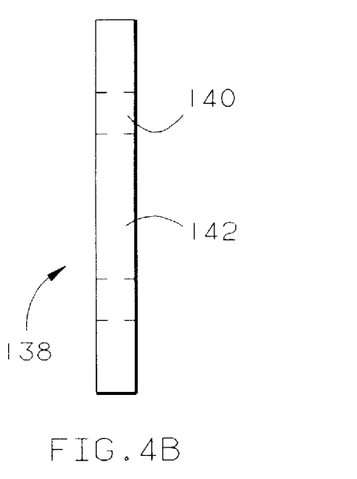

As illustrated in the embodiment of FIGS. 4A and 4B, a dielectric substrate 142 is plated with a first conductive layer 144 and a second conductive layer 146 which respectively contain apertures 140 and which are disposed in a single plane. The smaller diameter circle 148 represents the diameter of the electrical conductor 102 and the larger diameter circle 150 represents solder or other metallization or the conductive sleeve 128 for forming an electrical connection with the electrical conductor. The first electrical conductive layer 144 is electrically connected to a first one of the plurality of electrical conductors 102 and the second electrically conductive layer 146 is connected to a second one of the plurality electrical conductors 102. If additional electrical conductors were to be contained in the filter assembly, additional electrically conductive layers and a corresponding additional number of apertures would be provided on the dielectric substrate 142 to make the additional necessary electrical connections. Because of the slight lesser outer diameter of the first and second electrically conductive layers 144 and 146 relative to the underlying substrate 142, no electrical connection is made therebetween and the electrically conductive section 114 of the wall 112.

Sandwiched between individual layers 138 in the embodiment of FIGS. 4A and 4B are third conductive layers (illustrated in FIG. 3) which have an underlying substrate like substrate 142 and which are completely electrically plated to cover the entire top surface area, as well as extending at least out to the outer periphery and over if necessary, so that an electrical connection may be made with the electrically conductive section 114 such as illustrated in FIG. 3. With respect to FIG. 3, the layer of FIGS. 4A and 4B are those layers which contact the inner conductive sleeve 128 or solder as illustrated in FIGS. 4A and 4B. The third conductive layers are those layers which contact the outer conductive sleeve 130 or solder if used. The third conductive layers have the same apertures 140 but are not soldered to the individual electrical conductors so as to maintain an electrical isolation consistent with the configuration, as illustrated in FIG. 3, and are spaced apart and electrically insulated from each other and electrically insulated from the first and second conductive layers and in electrical contact with the electrically conductive section 114 of the wall 112.

Figure 5A:
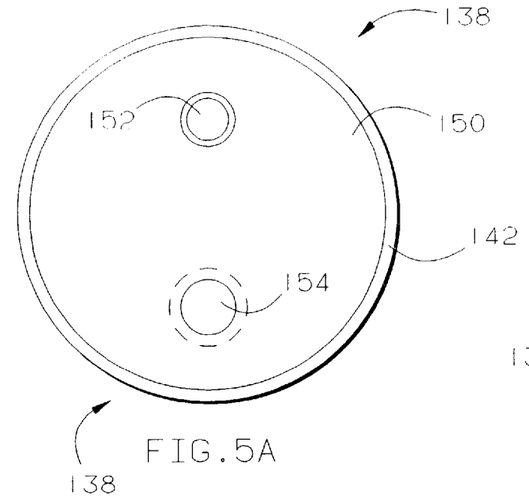
FIGS. 5A and 5B are a second embodiment of layers utilized to fabricate capacitor elements in accordance with the present invention.
Figure 5B:
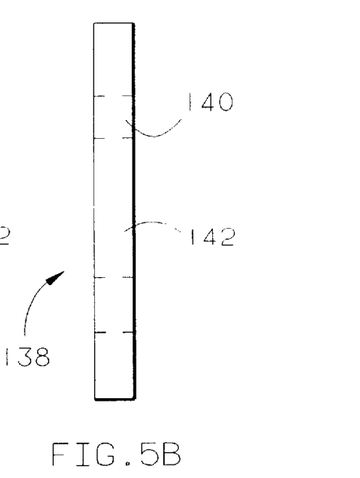

FIGS. 5A and 5B illustrate an alternative embodiment of the conductive plates 138 and underlying dielectric substrate 142 of the present invention in which the dielectric substrate is plated with an electrically conductive layer 151 which has an outer diameter slightly less than the outer diameter of the substrate. The apertures 152 and 154 are of different diameters. The top aperture 152 has the same diameter as the aperture 140 in the embodiment of FIGS. 4A and 4B and is intended to be soldered or connected with a conductive sleeve 128 to one of the electrical conductors 102 to establish electrical contact between the electrically conductive layer 151 and the electrical conductor 102. The other aperture 154 is larger in diameter to avoid any possibility of contact with the other of the plurality of electrical conductors 102. In this configuration, a sandwich of three layers which may repeat in sequence to increase the overall capacitance is made. The top layer is configured as illustrated in FIGS. 5A and 5B and soldered or connected with a conductive sleeve 128 to one of the electrical conductors 102. Next, a layer identical to the third underlying layer described above in association with FIGS. 4A and 4B in which the electrically conductive layer extends all the way out to the outside diameter of the underlying substrate 142 and possibly over the edge to promote electrical contact with the electrically conductive section 114 of the wall 112 with the apertures therein which receive the electrical conductors being larger in diameter, such as the diameter 154, to not contact and not establish electrical contact between any of the electrical conductors 102 and a second conductive layer in which the relative positions of the apertures 152 and 154 are rotated 180° so that the other electrical conductor is soldered or connected with a conductive sleeve 128 to aperture 152 when rotated 180° to form an alternating sequence of layers containing the first, second and third electrical conductors.

Figure 6:
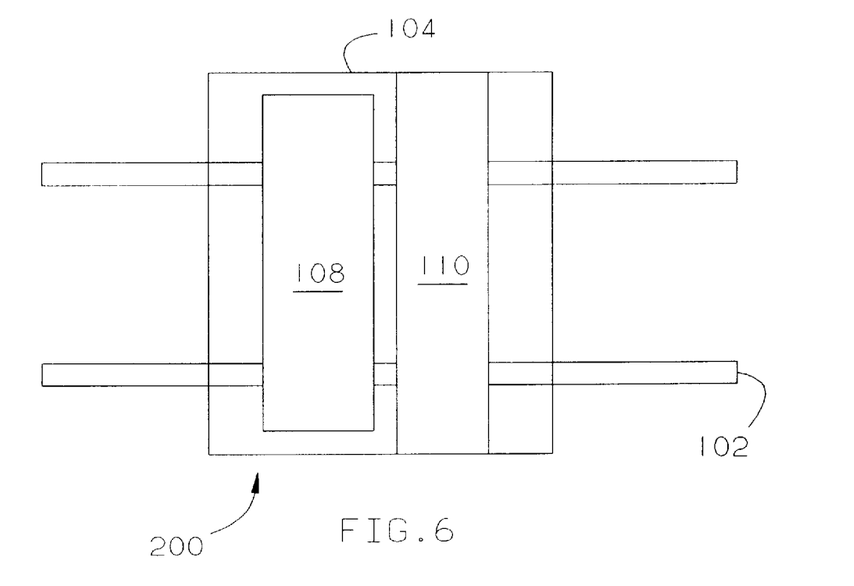
FIG. 6 is a second embodiment of a filter assembly in accordance with the present invention containing a single inductive element and a single capacitive element providing common-mode filtering for a plurality of electrical conductors.

FIG. 6 illustrates another embodiment 200 of a filter assembly in accordance with the present invention for performing common-mode filtering of common-mode electrical currents flowing in a plurality of electrical conductors 102. The embodiment 200 has a single inductive element 108 and a single capacitive element 110 which may have the configuration of the individual elements as illustrated in FIGS. 2, 3 and 4A and 4B. It should be understood that the embodiment 200 is illustrated only in a simplified form to depict a filter assembly for performing common-mode filtering of noise current flowing in the plurality of electrical conductors 102 with a single inductive element 102 and a single capacitive element 110.

Figure 7:
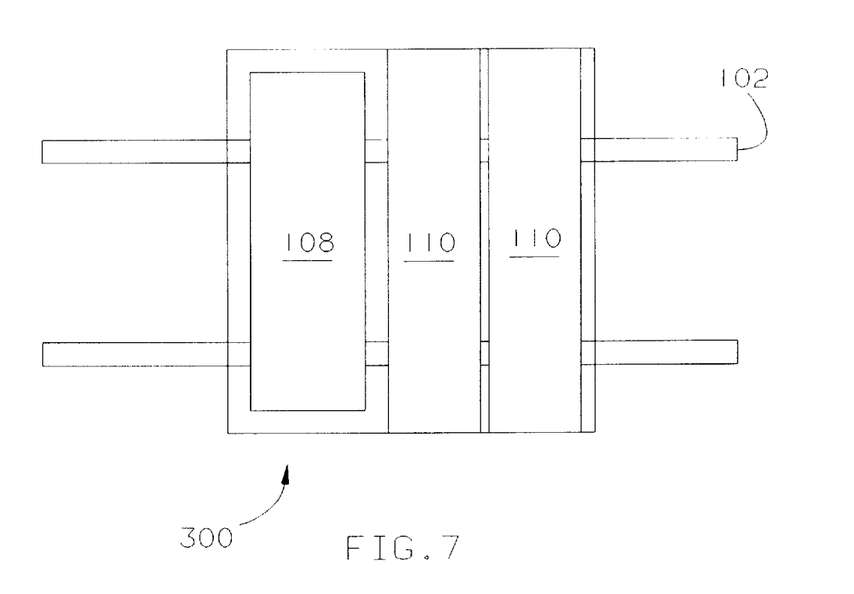
FIG. 7 is a third embodiment of a filter assembly in accordance with the present invention containing a single inductive element and a pair of capacitive elements for providing common-mode filtering of electrical current flowing in a plurality of electrical conductors.

FIG. 7 illustrates an additional embodiment 300 of a filter assembly in accordance with the present invention for providing common-mode filtering of electrical currents flowing in a plurality of electrical conductors 102. The embodiment 300 has a single inductive element 108 and two capacitive elements 110 having a configuration like that illustrated in FIGS. 2, 3, 5A and 5B. It should be understood that the embodiment 300 has been illustrated only in a simplified form omitting detailed structures, such as in FIGS. 2 and 3, to depict a filter assembly for providing common-mode filtering of noise current flowing in the plurality of electrical conductors with a single inductive element and a pair of capacitive elements.

Figure 8:
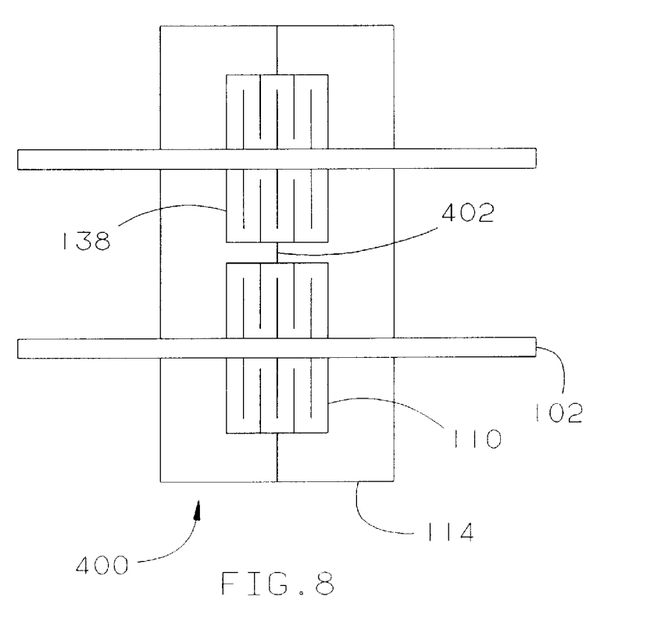
FIG. 8 is a third embodiment of a filter assembly in accordance with the present invention containing first and second capacitive elements for providing common-mode filtering of electrical current flowing in a plurality of electrical conductors.

FIG. 8 illustrates an additional embodiment 400 of a filter assembly in accordance with the present invention for performing common-mode filtering of common-mode electrical current flowing in a plurality of conductors 102. It should be understood that the embodiment 400 is a simplified illustration of two capacitors 110 which are connected together by an electrical conductor 402 which is illustrated in simplified form like FIGS. 5A and 5B. It should be understood, the electrical connection may be accomplished with other electrical connections such as extension of each of the electrical conductive layers 138 across the gap between adjacent conductive layers of adjacent stacks which do not contact the electrical conductors 102, to form a single metallic layer plated upon a ceramic substrate. As illustrated, the capacitors 110 filter common-mode current flowing in the electrical conductors 102.

Figure 9:
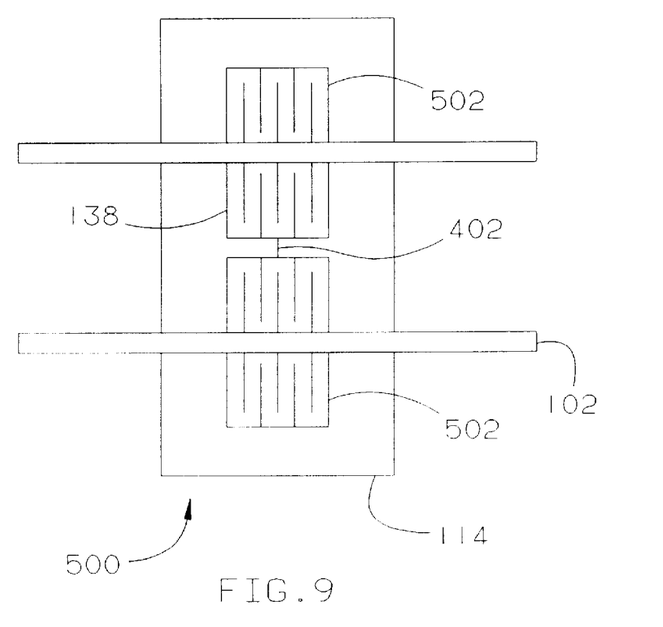
FIG. 9 is a fourth embodiment of a filter assembly in accordance with the present invention containing first and second capacitive elements providing differential-mode filtering of electrical current flowing in a plurality of electrical conductors.

FIG. 9 illustrates another embodiment 500 of the present invention which differs from the embodiment of FIG. 8 by removing electrical contact between the housing 114 and the capacitive elements 110 which converts the filter configuration into a differential-mode capacitive filter. The individual capacitors 502 are connected together by electrical conductor 402 in the same manner as FIG. 8 and further, the configuration of the conductive layers 138 may be modified in the same manner as described above in conjunction with FIG. 8.

Figure 10:
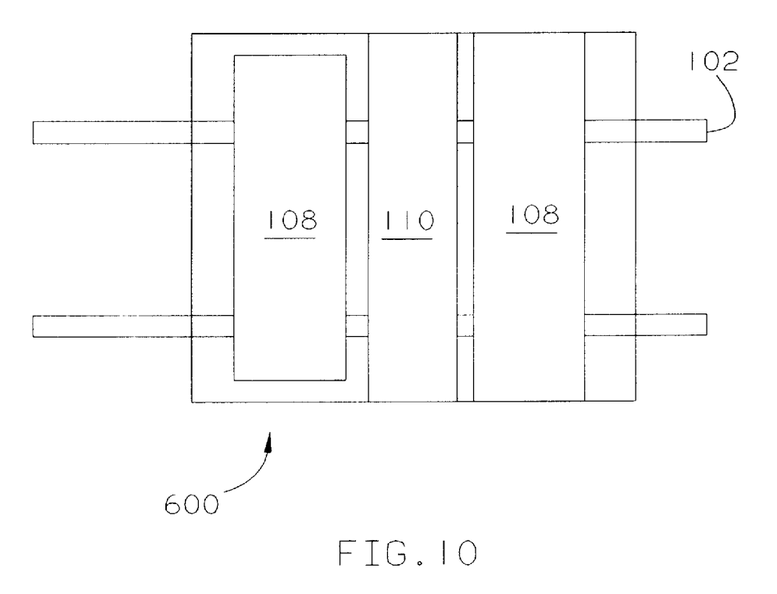
FIG. 10 is a fifth embodiment of a filter assembly in accordance with the present invention containing a pair of inductive elements and a single capacitive element for providing common-mode filtering of electrical current flowing in a plurality of electrical conductors.

FIG. 10 illustrates another embodiment 600 of a filter assembly in accordance with the present invention illustrated only in simplified form with detailed structures, such as illustrated in FIGS. 2 and 3 having been omitted, for providing common-mode filtering of common-mode current flowing in a plurality of conductors having two inductive elements 108 and a capacitive element 110 for electrical current flowing in a plurality of conductors 102. The configuration of the inductive elements 108 and capacitive element 110 may be in accordance generally with that discussed in FIGS. 2 and 3.

Figure 11:
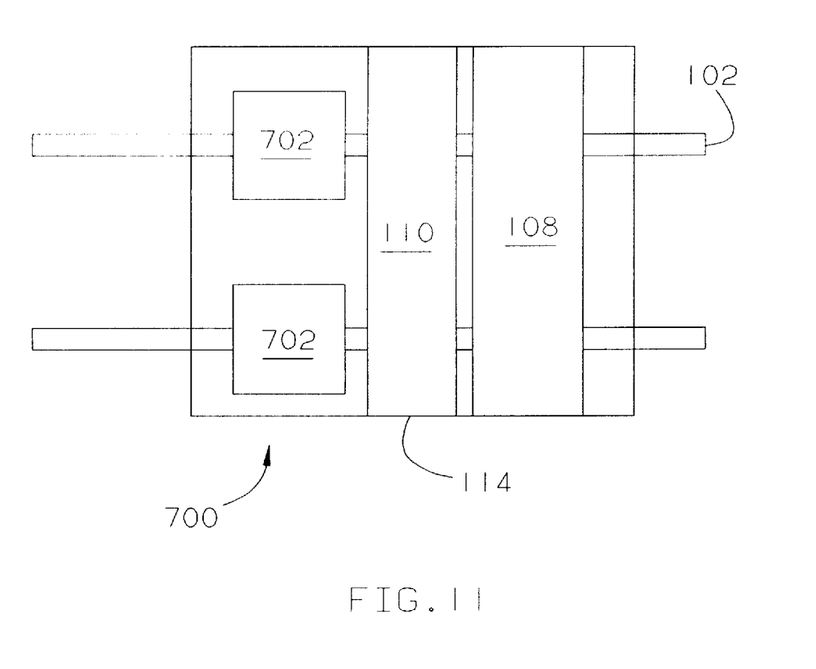
FIG. 11 is a sixth embodiment of a filter assembly in accordance with the present invention containing a first capacitive element and a first inductive element for providing common-mode filtering of electrical power flowing in a plurality of electrical conductors and second and third inductors for respectively providing differential-mode filtering of electrical current flowing in the plurality of electrical conductors.

FIG. 11 illustrates another embodiment 700 of a filter assembly illustrated only in simplified form with detailed structures, such as illustrated in FIGS. 2 and 3 having been omitted, for providing common-mode filtering of common-mode current flowing in a plurality of conductors 102 and differential-mode filtering of noise current flowing in the individual electrical conductors having an individual inductive element 108 and an individual capacitive element 110 generally in accordance with the embodiment of FIGS. 2 and 3 for performing the aforementioned common-mode current. An additional inductive element 702 in a closed loop extends around one of the plurality of electrical conductors 102 and is electrically isolated therefrom and the electrically conductive portion 114 of the wall to provide inductive differential-mode filtering of electrical current flowing in each of the electrical conductors 102 contained in the closed loop.

Figure 12:
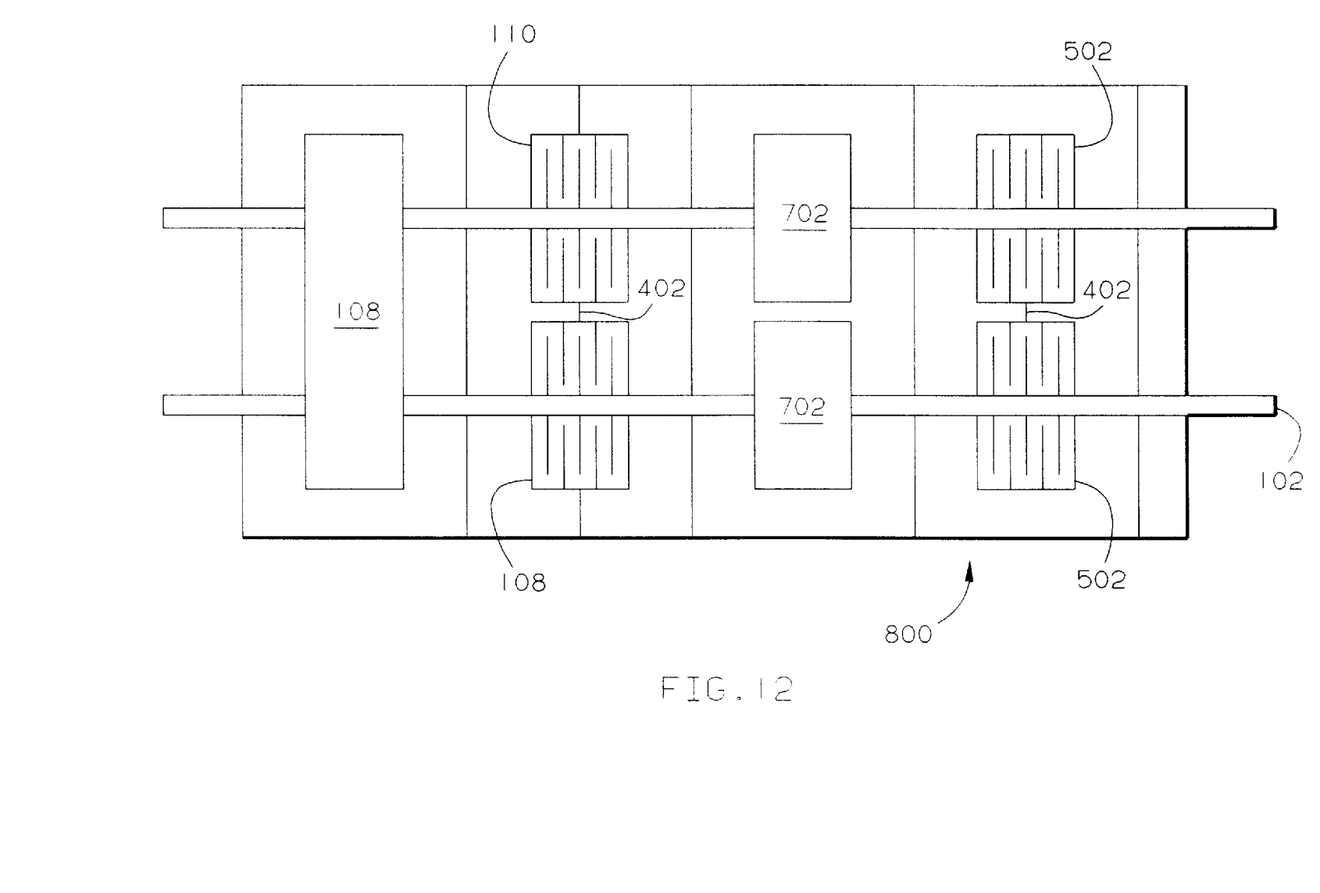
FIG. 12 is a seventh embodiment of a filter assembly in accordance with the present invention containing a first inductive element and a first capacitive element for providing common-mode filtering of electrical current flowing in a plurality of electrical conductors and further a second capacitive element and second and third inductive elements for respectively providing differential-mode filtering of electrical current flowing in the plurality of electrical conductors.

FIG. 12 illustrates another embodiment 800 of a filter assembly in accordance with the present invention for performing a combination of common-mode and differential-mode filtering of current flowing in the plurality of conductors 102. It should be understood that the illustration is in a simplified form with the omission of detailed structures such as in FIGS. 2 and 3 having been made. As illustrated, common-mode electrical filtering of current flowing in the conductors 102 is provided by inductive element 108 and capacitive element 110. Furthermore, individual differential-mode capacitive filtering is provided by capacitive elements 502 and inductive elements 702 as illustrated.

The present invention is not limited to the particular configuration of first, second and third conductive layers formed on a substrate as described above in FIGS. 3, 4A, 4B, 5A and 5B. Moreover, the present invention is not limited to any particular type of ferromagnetic materials. Additionally, other configurations of the housing than as illustrated in FIG. 3 may be used. Finally, the present invention is not limited to any particular configuration of filter and any particular combination of induction elements 108 and capacitive elements 110.

While the invention has been illustrated in terms of its preferred embodiments, it should be understood that the numerous modifications may be made thereto without departing from the spirit and scope of the invention as defined in the appended claims. It is intended that all such modifications fall within the scope of the appended claims.

We claim:

1. A filter assembly for providing at least common-mode filtering comprising:

a plurality of spaced apart electrical conductors for carrying at least common-mode electrical current;

a housing electrically isolated from the plurality of electrical conductors and containing a length of the plurality of electrical conductors, the housing having an interior cavity defined by a wall having at least a partially electrically conductive section, the wall extending outward from two longitudinally spaced apart locations of the length of the plurality of electrical conductors and between the plurality of electrical conductors at a position spaced from the plurality of electrical conductors to form the cavity;

at least one inductive element formed into a closed loop of low reluctance extending around the plurality of electrical conductors and electrically isolated therefrom and the electrically conductive section of the wall to provide an inductance common to the plurality of electrical conductors; and at least one capacitive element providing common mode filtering of the common mode electrical current flowing in the plurality of spaced apart electrical conductors each capacitive element having an electrical contact with the electrically conductive section of the wall and the plurality of electrical conductors to provide capacitance between the plurality of electrical conductors and the electrically conductive section of the wall.

2. A filter assembly in accordance with claim 1 wherein:

each capacitive element comprises a stack of spaced apart conductive layers having a number of apertures equal in number at least to a number of the plurality of electrical conductors which extend through the layers, respectively receive a different one of the plurality of electrical conductors and which each respectively form an electrical contact with a different one of the plurality of the electrical conductors.

3. A filter assembly in accordance with claim 2 wherein:

the plurality of conductive layers further comprise a plurality of first conductive layers which are spaced apart and electrically insulated from each other and are in electrical contact with only one of the plurality of electrical conductors, a plurality of second conductive layers which are spaced apart and electrically insulated from each other and electrically insulated from the first conductive layers and are in electrical contact with only another one of the plurality of electrical conductors, and a plurality of third conductive layers which are spaced apart and electrically insulated from each other and electrically insulated from the first and second conductive layers and in electrical contact with the electrically conductive section of the wall.

4. A filter assembly in accordance with claim 3 wherein:

pairs of the first and second conductive layers are disposed in a common plane in the stack and electrically insulated from each other.

5. A filter assembly in accordance with claim 4 wherein:

the at least one inductive element is a ferromagnetic toroid; and the at least one capacitive element is a ceramic capacitor.

6. A filter assembly in accordance with claim 3 wherein:
the at least one inductive element is a ferromagnetic toroid; and
the at least one capacitive element is a ceramic capacitor.

7. A filter assembly in accordance with claim 3 wherein:
the stack of conductive layers alternate in electrical connection with the conductive section of the wall and one of the plurality of electrical conductors.

8. A filter assembly in accordance with claim 7 wherein:
the at least one inductive element is a ferromagnetic toroid; and
the at least one capacitive element is a ceramic capacitor.

9. A filter assembly in accordance with claim 3 wherein:
the first and second conductive layers each have the plurality of apertures for receiving the plurality of electrical conductors with each of the apertures of each of the first or second plurality of conductive layers being in electrical contact with a different one of the plurality of electrical conductors with each of the first and second conductive layers being in a different plane in the stack.

10. A filter assembly in accordance with claim 9 wherein:
the at least one inductive element is a ferromagnetic toroid; and
the at least one capacitive element is a ceramic capacitor.

11. A filter assembly in accordance with claim 2 wherein:
the stack of conductive layers alternate in electrical connection with the conductive section of the wall and one of the plurality of electrical conductors.

12. A filter assembly in accordance with claim 11 wherein:
the at least one inductive element is a ferromagnetic toroid; and
the at least one capacitive element is a ceramic capacitor.

13. A filter assembly in accordance with claim 2 wherein:
the at least one inductive element is a ferromagnetic toroid; and
the at least one capacitive element is a ceramic capacitor.

14. A filter assembly in accordance with claim 2 further comprising:
at least one outer electrically conductive sleeve, each outer electrically conductive sleeve being in electrical contact with an inner surface of the conductive section of the wall and an outer periphery of at least one capacitive element; and
at least one inner electrically conductive sleeve, each inner electrically conductive sleeve being in electrical contact with only one of the apertures and only one of the plurality of electrical conductors.

15. A filter assembly in accordance with claim 14 wherein:
the at least one inductive element is a ferromagnetic toroid; and
the at least one capacitive element is a ceramic capacitor.

16. A filter assembly in accordance with claim 1 wherein:
the at least one inductive element is a ferromagnetic toroid; and
the at least one capacitive element is a ceramic capacitor.

17. A filter assembly in accordance with claim 1 further comprising:
at least one additional inductive element, each additional inductive element being formed into a low reluctance closed loop extending around less than all of the plurality of electrical conductors and electrically isolated therefrom and the electrically conductive section of the wall to provide differential-mode filtering of electrical current flowing in the less than all the plurality of electrical conductors contained in the closed loop.

18. A filter assembly in accordance with claim 1 further comprising:
at least one additional capacitive element, each additional capacitive element being electrically isolated from the electrically conductive section of the wall and electrically connected to less than the plurality of electrical conductors to provide differential-mode filtering of electrical current flowing in less than the plurality of electrical conductors.

19. A filter assembly in accordance with claim 18 wherein:
each additional capacitive element comprises an additional stack of spaced apart conductive layers having at least one aperture which extends through the additional stack and which forms an electrical contact with at least one of the plurality of electrical conductors with a different aperture contacting a different one of the at least one electrical conductor and being electrically isolated from the conductive section of the housing which extends between the two longitudinally spaced apart locations.

20. A filter assembly in accordance with claim 19 wherein the at least one additional capacitive element comprises:
at least one first electrically conductive layer and at least one second electrically conductive layer, each of the first and second electrically conductive layers being spaced apart and electrically insulated from each other, the at least one first electrically conductive layer being in electrical contact with the at least one of the plurality of electrical conductors through electrical contact with one aperture and not in electrical contact with the conductive section of the wall and the at least one second electrically conductive layer being electrically insulated from the at least one electrical conductor and the conductive section of the wall.

21. A filter assembly in accordance with claim 1 further comprising:
at least one insulating adhesive layer, each insulating adhesive layer connecting a face of one of the at least one inductive element to a face of one of the at least one capacitive element; and
at least one force applying element, each force applying element applying a force axially to at least one inductive and at least one capacitive element connected with the insulating adhesive layer and further providing for compensation for variation in a dimension of the at least one inductive and capacitive element parallel to the plurality of conductors.

22. A filter assembly in accordance with claim 21 wherein:
each force applying element is a compressed O-ring.

23. A filter assembly in accordance with claim 22 wherein:
each O-ring contacts a face of one of the at least one inductive element or a face one of the at least one capacitive element extending from the plurality of electrical conductors.

24. A filter assembly in accordance with claim 1 wherein:
the wall of the housing comprises two conductive parts which are connected together by an insulative adhesive and a conductive element which is disposed inside of the housing which electrically connects the two conductive parts to provide an electrical current flow path around the insulative adhesive.

25. A filter assembly in accordance with claim 24 wherein:

the adhesive is thermally actuated.

26. A filter assembly for providing at least common-mode filtering comprising:

a plurality of spaced apart electrical conductors for carrying at least common-mode electrical current;

a housing electrically isolated from the a plurality of electrical conductors and containing a length of the plurality of electrical conductors, the housing having an interior cavity defined by a wall having at least a partially electrically conductive section, the wall extending outward from two longitudinally spaced apart locations on the length of the plurality of electrical conductors and between the plurality of electrical conductors at a position spaced from the a plurality of electrical conductors to form the cavity; and at least one capacitive element providing common filtering of the common mode electrical current flowing in the plurality of spaced apart electrical conductors, each capacitive element having an electrical contact with the electrically conductive section of the wall and the plurality of electrical conductors to provide capacitance between the plurality of electrical conductors and the electrically conductive section of the wall.

* * * * *